UNITED STATES PATENT OFFICE.

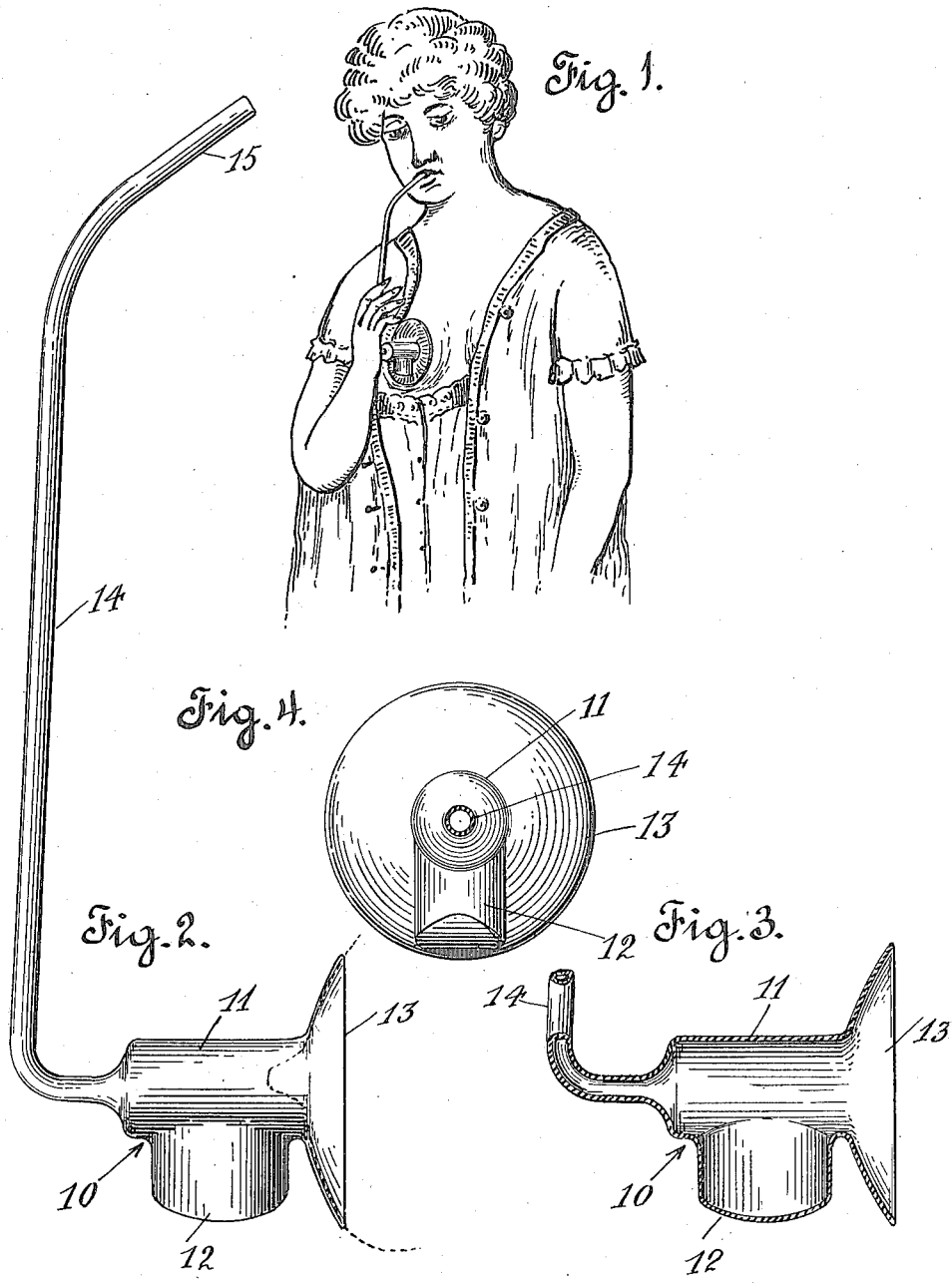

MARIE VOLQUARDS, OF VISALIA, CALIFORNIA.

BREAST-PUMP.

1,220,707. Specification of Letters Patent. Patented Mar. 27, 1917.

Application filed August 25, 1915. Serial No. 47,224.

*To all whom it may concern:*

Be it known that I, MARIE VOLQUARDS, a citizen of the United States, residing at Visalia, in the county of Tulare and State of California, have invented new and useful Improvements in Breast-Pumps, of which the following is a specification.

My invention relates to a breast pump. It is an object of my invention to construct an extremely simple, yet efficient and sanitary breast pump.

The ordinary breast pump for nursing mothers is operated by a rubber bulb, the suction of which at times causes pain. Furthermore the rubber bulb wears out and has to be replaced. My improved breast pump does away with the bulb, and substitutes therefor a means of suction which is painless and which may be regulated to a nicety.

With these and other objects in view, which will appear as the description proceeds, my invention consists in the construction and arrangement of parts hereinafter described and claimed.

In the accompanying drawings which form a part of this specification,

Figure 1, shows the device applied to its use.

Fig. 2, is a side elevation of the device.

Fig. 3, is a vertical cross-section of the body portion of the same.

Fig. 4, is a front elevation of the device with the suction tube broken away.

The breast pump consists of a rigid receptacle 10 made of glass. The upper section 11 thereof is cylindrical in shape and horizontally disposed. The lower section is a cup shaped extension 12, extending downwardly from the upper section. The cup shaped section serves for the reception of the milk. One end of the cylindrical section 11 is enlarged to form a spherically shaped milk inlet 13, which has a circular bearing surface or edge adapted to form an air tight bearing on the portion of the human breast surrounding a nipple, to which it is applied. The other end of the cylindrical section 11 is contracted to form a suction tube of small diameter. This tube after extending horizontally for a small distance projects upwardly forming a substantially vertical section 14, and ends in an oblique mouth piece 15. The suction tube is of a length sufficient to be inserted into the mouth of the woman using the breast pump.

From the foregoing description the operation of the device will be easily understood. The milk inlet of the device is firmly pressed against the breast to which it is to be applied so that the nipple thereof will extend into the cylindrical section, as shown in Fig. 2. Suction is then applied to the mouth piece. The partial vacuum thus created within the device will cause the breast to form an air tight closure with the flaring walls of the milk inlet, and will draw milk through the nipple. The milk flows into the milk cup 12, where it is collected.

It is thus seen that I have devised a breast pump simple of construction and positive in operation. The device being entirely made of glass may be sterilized by boiling water, and thus may be easily kept in a sanitary condition. There are no movable parts liable to become worn. Furthermore the same may be applied even to tender breast without causing pain, since the vacuum acting on the breast is under the absolute and instant control of the person using the device.

I claim:

A breast pump made entirely of glass, comprising a closed milk receptacle provided with a cup-shaped lower section, and having a lateral circular milk inlet, said milk inlet having a curved surface adapted to make an air-tight bearing on the portion of the human breast surrounding a nipple, and a tube formed integral with said receptacle extending upwardly therefrom and being bent at its upper end in a direction above said milk inlet, said tube being of a length to reach from the breast to the mouth of the user.

In testimony whereof I have signed my name to this specification.

MARIE VOLQUARDS.